United States Patent Office 3,494,872
Patented Feb. 10, 1970

3,494,872
MANUFACTURE OF MINUTE CAPSULES, EN MASSE, AND DEWATERING THEIR WALLS
Theodore Maierson and Victor A. Crainich, Jr., Dayton, Ohio, assignors to The National Cash Register Company, Dayton, Ohio, a corporation of Maryland
No Drawing. Filed Oct. 28, 1966, Ser. No. 590,218
Int. Cl. B01j *13/02;* C08h *19/02*
U.S. Cl. 252—316                                    5 Claims

ABSTRACT OF THE DISCLOSURE

A method is disclosed for preparing, en masse, in a liquid manufacturing vehicle, minute capsules having walls comprising a complex of gelatin and derivatives of sulfonic acid. Further, as an additional embodiment, a method is disclosed for treating water-swollen gelatin-containing capsule walls with derivatives of sulfonic acid in order to reduce the water concentration therein.

---

This invention pertains to the en masse preparation of minute capsules by the method of liquid-phase separation from solution (coacervation) wherein an aqueous gelatin solution may be treated with derivatives of sulfonic acid in order to cause separation of a liquid capsule-wall-forming material from the aqueous manufacturing vehicle in equilibrium therewith. The invention also relates to a method of treating already-formed capsules whose gelatin-containing walls are in the swollen state with derivatives of sulfonic acid in an aqueous slurry, said treatment having the effect of improving certain physical characteristics of the capsules by reducing the water concentration (i.e., "dewatering") in the water-swollen capsule walls.

The use of water-soluble sulfonic acids and water-soluble derivatives of sulfonic acid in the art of hardening of dried gelatin films is well established. Also known is the use of such sulfonic acids and their derivatives in the formation of solid water-insoluble gelatin complex precipitates in the photography art. Until now, the formation of a coacervate by use of sulfonic acid and the derivatives of sulfonic acids and its use in making capsules have not been known. The process of capsule formation, en masse, utilizing the phenomenon of phase separation in most cases requires the existence of a coacervate liquid which wets and wraps around intended capsule core entities dispersed in the system. Although the prior art teaches the reaction of sulfonates with gelatin in a dried film and the reaction of sulfonates with gelatin in solution to form a solid, water-insoluble precipitate, neither reaction is useful in the encapsulation art.

Surprisingly, it has been found that water-soluble sulfonic acids and certain derivatives thereof can be used, with careful control of process parameters, to form a homogeneous solution of a gelatin-sulfonate coacervate phase which can be used to form the walls of capsules, which walls, can retain either liquid or solid, essentially water-insoluble, core entities or internal phase materials that may be provided for that purpose. The product resulting from the reaction between gelatin and the subject sulfonate materials is a pH-reversible coacervate material as opposed to the irreversibly cross-linked reaction product of other capsule-wall forming co-reactants such as formaldehyde with gelatin, as disclosed in United States Patent No. 2,800,457, which issued July 23, 1957, on the application of Barrett K. Green and Lowell Schleicher. Furthermore, the subject material exists reversibly with respect to changes in concentration of reactants and other system parameters.

The use of the above-mentioned reaction between gelatin and certain sulfonate materials to form capsule walls demonstrates several benefits over other, well-known, methods practiced at the present time. The following are two of the said benefits: (1) The sulfonate materials, at the present time, have lower cost than other gelatin-complex-coacervate-inducing materials such as gum arabic; and (2) The process parameters and the reaction characteristics of the subject reaction allow encapsulation at a system solids concentration much higher than previously utilized, thus admitting a substantial decrease in processing cost by increasing capsule production per unit manufacturing volume.

An additional utility of the reaction between sulfonates and gelatin and gelatin-containing coacervates resides in the "dewatering" of capsule walls which have previously been formed by conventional encapsulation techniques but which remain in a water-swollen state in an aqueous slurry, care being taken not to leave the coacervate state. In this case, "dewatering" is a term used to denote a substantial decrease in the water content of a water-swollen capsule wall as it exists in an aqueous environment. Stated in different terms, a dewatered capsule wall is a capsule wall in which the previously water-swollen wall material has been shrunken by the exclusion of water, so that, while it is not dry, it displaces much less volume than a capsule wall which has not been so treated. Such dewatering of capsule walls is useful in many areas of capsule manufacture and use: (1) when capsules are to be dried and isolated to form individual entities acting, in a mass, as though they were a solid- or a liquid-containing free-flowing powder, the dewatering of capsule walls greatly facilitates and speeds capsule wall drying; (2) in the manufacture of capsule-supplied paper products, the use of capsules whose walls have been dewatered allows a faster production rate by virtue of the decreased time required for drying the encapsulated components of a paper coating or furnish. The above-mentioned two uses for capsules whose walls have been dewatered by the novel treatment find importance due to economic benefits derived from increased production rate with a given system of equipment. The following three uses for the novel treatment pertain to improved product quality: (1) The treatment materials act, in some ways, as surfactants and lend hydrophobic characteristics to the capsule walls, thus lessening the tendency for capsule agglomeration during the drying and isolation steps of capsule manufacture; (2) The dewatering treatment is reversible and yet possesses some of the insolubility attributes of chemical cross-linking associated with gelatin-containing materials. Capsules can, therefore, be dewatered and efficiently dried and isolated, and the capsule walls can be made to reassume water solubility when dispersed in an aqueous system above a certain critical pH (3) for reasons not entirely understood, a capsule wall which has been dewatered by the novel treatment prior to drying and isolation is more impervious to loss of capsule contents by diffusion through the wall than capsules which have not undergone the dewatering treatment.

A specific object of this invention is to provide a method for preparing, en masse, minute capsules by the technique of forming a separated phase of potential capsule-wall-forming material by means of a complexing reaction between a suffonate compound and gelatin in an aqueous manufacturing vehicle and then causing said separated phase to encase capsule core entities.

A further object of this invention is to provide a method for treating said capsules prior to drying of the walls to form individual capsule entities having the appearance of a free-flowing, powder-like, material and having capsule walls which demonstrate improved physical characteristics.

A still further object of this invention is to provide a method for treating water-swollen already-formed gelatin-containing capsule walls, made by any method, in an aqueous slurry in such a manner as to cause much of the absorbed water to be excluded from the capsule wall.

A further object of this invention is to provide a method for subsequently dewatering the walls of capsules which have been prepared by the phase separation technique of this invention, said dewatering requiring merely a slight change in the conditions of the system from those conditions necessary for phase separation.

With these and other objects in mind, the invention will now be fully disclosed, from which disclosure other useful objects which are inherent in the scope of this invention will be apparent to one skilled in the art.

While, as stated previously, the reaction between sulfonate materials and gelatin is well known, the establishment of reaction conditions in order that the product of the reaction between sulfonates and gelatin in solution forms a second, water-containing, coacervate liquid phase in equilibrium with a continuous liquid phase dilute in gelatin and sulfonate materials is novel.

The phase separation and encapsulation process of this invention seems to be similar, in some respects, to the process of the cited United States patent to Green et al., to which reference has been made, in which two hydrophilic polymeric materials are employed, each having opposite electrical charges, and are reversibly combined by virtue of the forces associated with their opposite electrical charge characteristics. In the phase separation of the Green et al. invention, two oppositely-charged polymeric materials are combined through the interaction of differing electrical charges associated with said materials, and the same opposite charge situation prevails in the subject invention, but in the subject invention only one of the materials is polymeric.

The aforementioned novel dewatering phenomenon is also a direct result of a complexing reaction, carried a little further and requiring only a slight pH alteration from the conditions of coacervate phase separation for its realization.

The capsules prepared by the method of this invention can vary in size from 1 to 2 microns up to 5,000 microns or perhaps larger, the size depending upon encapsulation conditions, which may be adjusted in accord with the product requirements. Any essentially water-insoluble solid or liquid material can be encapsulated by the process of this invention provided that it does not react, under encapsulation conditions, with either the gelatin or the sulfonate materials and will be wetted by the coacervate. Examples of a few of the materials which are eligible for encapsulation and subsequent capsule wall treatment by the novel method include volatile non-polar solvents such as toluene, xylene, and cyclohexane; relatively non-volatile liquids such as silicone oils and halogenated hydrocarbons; and solids such as pigments, minerals, and water-insoluble organic materials. As an additional feature of this invention, preformed capsules prepared by encapsulation methods other than sulfate-induced phase separation can also be treated with the sulfonate materials. Any water-swollen capsule wall which contains gelatin as a wall component can be dewatered by the subject process.

The sulfonate materials which can be used in the practice of this invention to encapsulate water-insoluble materials and subsequently dewater the so-formed walls include unsubstituted naphthalene sulfonic acids and their water-soluble salts; alkyl naphthalene sulfonic acids and water-soluble alkyl naphthalene sulfonate salts, and alkyl benzene sulfonic acids and their water-soluble sulfonate salts, where, in all cases, "alkyl" represents a saturated hydrocarbon group containing from 2 to 24 carbon atoms; various salts of lignin-sulfonates, such as sodium lignin-sulfonates and calcium lignin-sulfonates; and sodium phenolic sulfonates and other water-soluble salts of phenolic sulfonates. There are many other sulfonic acids and sulfonate materials which operate equivalently in the practice of this invention, and such materials, if otherwise eligible, will be considered as falling within the scope of this invention. It is apparent that the otherwise great diversity between the various sulfonates shown to be eligible for use in this invention demonstrates a general applicability of sulfonate compounds to the liquid phase separation and dewatering treatment of gelatin initially in water solution.

The invention having been disclosed in a general manner, specific embodiments of the invention will be described with respect to the novel encapsulation process and the capsule wall dewatering treatment. It will be readily seen, and understood as obvious, that the examples, by their diversified nature, are intended to demonstrate the broad scope of the invention rather than limit it in any way.

EXAMPLE I (PREFERRED)

Into a one-liter vessel equipped for heating and agitation were placed 21 grams of sodium lignin-sulfonate and 750 grams of water. This mixture was stirred and warmed to effect solution, after which the system pH was 5.65. To the warmed (50 to 55 degrees centigrade) sulfonate system was added 180 milliliters of an 11 percent, by weight, gelatin (isoelectric point, pH 8 to 9; bloom strength, 285 to 305 grams) solution also at a temperature of 50 to 55 degrees centigrade, thus lowering the system pH, in this experiment, to 4.8. After the addition of the gelatin solution, a stringy, semi-liquid, phase of gelatin solution emerged from the liquid system, which emergent phase was changed into a mobile liquid phase by adjusting the pH to 5.3. While the system was maintained at a temperature of 50 to 55 degrees centigrade, 250 milliliters of toluene was added to the two-phase system, and the rate of agitation was adjusted to yield toluene droplets 100 to 300 microns in diameter. The heating source was turned off, and agitation was continued until, after about three hours, the system had cooled to nearly room temperature. During the cooling, the emergent separated phase, high in gelatin content, began to wrap around and encase the toluene droplets at about 37 degrees centigrade; and, at about 28 degrees centigrade, substantially all of the separated phase had been collected by the toluene droplets to form embryonic capsule walls. The pH of the stirred system was then adjusted to 4.8—this adjustment, which represents the dewatering treatment of this invention, caused the capsule walls to contract to about one tenth of their original thickness—and the system was allowed to continue stirring for about an additional fifteen minutes. After the completion of the sulfonate treatment, agitation was stopped, and the capsules were allowed to separate from the manufacturing vehicle, and said manufacturing vehicle was then discarded and replaced with a like amount of water. The capsule-containing system was then stirred to redisperse the capsules, and the wash-water was removed by vacuum filtration. The resultant filter cake of wet capsules was then redispersed in an amount of water about equal, in weight, to the filter cake to form a thick slurry of capsules. Three hundred grams of powdered, amorphous, silicon dioxide having an average particle size of 4 microns (such as "Syloid 244," sold by Davison Chemical Company, Baltimore, Md., U.S.A.) was mixed with the capsule slurry. The silicon dioxide was used to serve as an inert filler or separating material in preventing the adhesion of one capsule wall to another during drying. The capsule-silicon dioxide-water mixture was then placed on a forced air dryer and subjected to air having a temperature of about 25 degrees centigrade until the capsules were particulate, individual, entities.

EXAMPLE II

In this example, essentially the same encapsulation process was used except that the system was much higher in concentration of capsule-making materials, thus demonstrating the versatility of the novel encapsulating system.

Into a one-liter vessel equipped for heating and agitation were placed 21 grams of sodium lignin-sulfonate and only 200 grams of water. This mixture was stirred to effect solution. To the warmed (50 to 55 degrees centigrade) sulfonate system was added 180 milliliters of an 11 percent, by weight, gelatin (as in Example I) solution, also at a temperature of 50 to 55 degrees centigrade. The pH of the system after addition of the gelatin solution was 4.8, and the emergent, semi-liquid, second phase was transformed into a mobile, fluid phase by adjustment of the pH to 5.0. The internal phase used in this example was a dye solution comprising crystal violet lactone in a carrier liquid of chlorinated biphenyl having a specific gravity of about 1.35, which dye solution is used in encapsulated form in the coating of various paper products. Two hundred and fifty milliliters of said liquid dye solution was added to the heated system, and agitation was adjusted to yield a dispersion of droplets of the dye solution having a diameter of about 25 microns. While agitation was maintained, the system was allowed to cool as in Example I, and, when about 28 degrees centigrade was reached, the system pH was adjusted to 4.8, thus shrinking the water-swollen capsule walls. The capsules were now ready for coating onto paper, which coating operation was accomplished in the laboratory with a drawdown applicator.

It should be pointed out at this time that Examples I and II demonstrate the great latitude in the concentration of materials allowable in the total system of this encapsulation process. The concentrations used in said two examples are not limiting values but merely present two systems which operate with good results. The relative concentration parameters of this encapsulation process are generally described in terms of (a) percent of gelatin by weight, in the total system, and (b) ratio of sulfonate material to gelatin material in the system. The concentration range for gelatin in the encapsulation system has been found to be from very dilute up to the point where difficulties are encountered due to premature gelation of the manufacturing vehicle. The gelatin concentration range for preferred operation is from 1 to 5 percent, by weight, of the total system weight, with the limits for operation extending down to ¼ percent or perhaps lower and up to about 10 percent. It has been found that the ratio, by weight, of sulfonate material to gelatin can range from about 1 to 4 to about 2 to 1, depending upon encapsulation conditions, such as pH, stirring rate, temperature, etc. Careful adjustment of system parameters may allow a wider range of sulfonate-to-gelatin ratios, but the given limits are generally preferred.

EXAMPLE III

In this example, already-formed capsules in the manufacturing vehicle, made as described below, were treated to shrink the capsule walls prior to drying. Such a treatment of already-formed capsules is useful in improving the physical characteristics of the capsule wall and in hastening the normal capsule-drying operations. Capsules were prepared according to the teaching of United States Patent No. 2,800,457, to which reference has been made, by adding 250 milliliters of d-limonene to a vessel containing 20 grams each of gum arabic and gelatin in solution in 1,020 milliliters of water, which solution was maintained at 40 degrees centigrade, with the pH adjusted to 4.5 to initiate the emergence of the coacervate. The agitated system was slowly cooled to about 25 degrees centigrade to complete the formation of capsules and was chilled to about 10 degrees centigrade to gel the capsule walls, and 10 milliliters of 25 percent, by weight, aqueous pentanedial was added to harden the capsule walls. The system was allowed to stir for about sixteen hours while slowly returning to room temperature, after which time the capsules were ready for the dewatering treatment. Twenty-five grams of an alkyl naphthalene sulfonate (such as "Neomerpin N," sold by E. I. du Pont de Nemours & Company, Wilmington, Del., U.S.A.) solution having an adjusted pH of 3.8 to 4.0 was added to the capsule-containing system, and the system was stirred for twenty-four hours after the system pH had been readjusted to 4.8 to 4.0. After the twenty-four-hour treatment reaction period, the capsules were dried as in Example I. The drying procedure there specified is not important, and any other known process for capsule wall drying could have been used. It is important to note that the treatment reaction is extremely dependent upon pH and temperature conditions. For instance, the reaction of this example, wherein the system pH was 3.8 to 4.0, required twenty-four hours at room temperature, the ultimate in wall shrinkage, as determined by microscopic examination, having occurred. At a temperature of 55 degrees centigrade, the same treatment reaction required only twenty minutes. At a pH of 5.0, very little reaction is evident at any temperature in twenty-four hours, and at a pH of about 3.2, the treatment reaction is practically instantaneous at 55 degrees centigrade.

EXAMPLE IV

In this example, minute capsules, which had been previously dried and were in the form of free-flowing, toluene-containing spheres having diameters of about 300 to 500 microns, were treated by the novel method. The capsules contained about 90 percent, by weight, toluene, and the capsule walls comprised gum arabic, gelatin, and two different poly(ethylene-co-maleic anhydride) materials having molecular weights of 1,000 to 2,000 and 60,000 to 70,000.

Three hundred grams of the capsules was dispersed in about 1,000 grams of water, and, after stirring for about fifteen minutes, 25 grams of the sodium salt of a phenolic sulfonate treatment material (such as "Suprak 57," sold by American Cyanamid Company, New York, N.Y., U.S.A.) was dissolved in the water, and the pH was adjusted to 3.8 to 4.0, as in Example III. The same reaction parameters and drying procedures from Example III apply to this example. Chemical hardening of capsules which are to be treated by this method is an optional process step which can be used if desired, but is not necessary.

EXAMPLE V

This example (a) demonstrates an encapsulation of a solid material, (b) demonstrates the use of a ratio of sulfonate material to gelatin different from prior examples, and (c) includes the optional chemical hardening step after sulfonate capsule-wall-shrinking treatment.

Eleven grams of the described "Neomerpin N" was dissolved in 350 milliliters of water (at about 50 degrees centigrade), and the warm solution was added to a vessel which contained 180 milliliters of an 11 percent, by weight, aqueous gelatin (quality as in Example I) solution, also warmed to about 50 degrees centigrade. This mixture was stirred, and the pH was adjusted to 5.1. While the agitation was maintained, 50 grams of silicon dioxide, having an average particle size of about 100 microns, was added to the system to serve as an experimental capsule internal phase. The agitated system was allowed to cool to cause formation of capsule walls, and, at a temperature of about 28 degrees centigrade, the pH was changed to 4.8 to shrink the capsule walls. After about fifteen minutes, the system was chilled to nearly 10 degrees centigrade, and 10 milliliters of a 25 percent, by weight, aqueous pentanedial solution was added to chemically harden the capsule walls. The system was allowed to stir for about sixteen hours, during which time the temperature slowly rose to ambient. To dry and isolate the capsule product, the supernatant manufacturing liquid was discarded, and the capsules were washed once with water and were then formed into a filter cake by vacuum filtration. The filter cake was then crumbled into pieces about one centimeter in diameter, and the pieces were oven-dried.

What is claimed is:

1. A method for preparing, en masse, minute capsules having walls which comprise the product of reaction between gelatin and a water-soluble, sulfonate-containing material taken from the group consisting of alkyl naphthalene sulfonic acids and their water-soluble salts, and alkyl benzene sulfonic acids and their water-soluble salts wherein "alkyl" represents a saturated hydrocarbon group containing 2 to 24 carbon atoms, unsubstituted sulfonic acids and their water-soluble salts, the water-soluble salts of lignin-sulfonates, and the water-soluble salts of phenolic sulfonates, including the steps of:
   (a) establishing an agitated aqueous system comprising ¼ to 10 percent, by weight, of said product of reaction material;
   (b) adjusting the pH and the temperature of the so-established system to provide mobile, fluid, particles dispersed, as a discontinuous phase of said product of reaction, in the residual aqueous manufacturing vehicle, the residual aqueous vehicle being now lower in gelatin concentration;
   (c) adding to the so-established system the intended capsule core entity material; and
   (d) cooling said system to cause the dispersed phase, which is high in gelatin concentration, to encase the intended capsule core entities to form capsule walls.

2. The method of claim 1 wherein steps (b) and (c) are reversed.

3. The method of claim 1 with the added step of:
   (e) adjusting the pH of the capsule-containing system to cause the water-swollen capsule walls to densify by virtue of a dewatering of the capsule walls.

4. The method of claim 2 with the added step of:
   (e) adjusting the pH of the capsule-containing system to cause the water-swollen capsule walls to densify by virtue of a dewatering of said capsule walls.

5. The process of dewatering, en masse, the gelatin-containing walls of minute capsules by the steps of:
   (a) establishing an agitated aqueous dispersion water-swollen gelatin-walled capsules;
   (b) treating said capsule walls by the addition, to said dispersion, of one or more water-soluble, sulfonate-containing materials taken from the group consisting of alkyl naphthalene sulfonic acids and their water-soluble salts, and alkyl benzene sulfonic acids and their water-soluble salts wherein "alkyl" represents a saturated hydrocarbon group containing 2 to 24 carbon atoms, unsubstituted sulfonic acids and their water-soluble salts, the water-soluble salts of lignin-sulfonates, and the water-soluble salts of phenolic sulfonates in the concentration of 0.1 to 2.5 grams of sulfonate-containing material for each gram of gelatin present in the system; and
   (c) adjusting the system pH to 3.2 to 5.0—the point where the capsule walls are shrunk by virtue of a densifying of said capsule walls.

References Cited

UNITED STATES PATENTS

| | | | |
|---|---|---|---|
| 2,527,267 | 10/1950 | Hart et al. | 260—117 X |
| 2,886,445 | 5/1959 | Rosenthal et al. | 99—135 |
| 3,043,782 | 7/1962 | Jensen | 252—316 |
| 3,069,370 | 12/1962 | Jensen et al. | 252—316 X |

RICHARD D. LOVERING, Primary Examiner

U.S. Cl. X.R.

117—36.1, 36.2, 100; 106—308; 260—117